United States Patent
Chapman et al.

(10) Patent No.: US 8,667,914 B2
(45) Date of Patent: Mar. 11, 2014

(54) WASTE TREATMENT

(75) Inventors: Chris Chapman, Oxfordshire (GB); Martin Brooks, Hertfordshire (GB); Rolf Stein, Surrey (GB); Edward S. Manukian, Falls Church, VA (US); Robert M. Clark, Irwin, PA (US)

(73) Assignee: Advanced Plasma Power Limited (GB)

( * ) Notice: Subject to any disclaimer, the term of this patent is extended or adjusted under 35 U.S.C. 154(b) by 769 days.

(21) Appl. No.: 12/776,143

(22) Filed: May 7, 2010

(65) Prior Publication Data

US 2011/0271883 A1 Nov. 10, 2011

(51) Int. Cl.
| | |
|---|---|
| *B09B 3/00* | (2006.01) |
| *F23D 14/00* | (2006.01) |
| *F23G 5/00* | (2006.01) |
| *F23G 7/00* | (2006.01) |
| *A47J 36/00* | (2006.01) |
| *A47J 36/24* | (2006.01) |
| *F23G 5/12* | (2006.01) |
| *B23K 9/00* | (2006.01) |
| *B23K 9/02* | (2006.01) |
| *A62D 3/19* | (2007.01) |

(52) U.S. Cl.
USPC .......... 110/346; 110/236; 110/246; 110/251; 110/252; 110/259; 219/121.36; 219/121.38; 588/311

(58) Field of Classification Search
USPC ............... 219/121.36, 121.38; 110/250, 346; 588/301, 311, 312
See application file for complete search history.

(56) References Cited

U.S. PATENT DOCUMENTS

| | | | |
|---|---|---|---|
| 3,736,111 | A | 5/1973 | Gardner et al. |
| 4,289,625 | A | 9/1981 | Tarman et al. |
| 4,718,362 | A | 1/1988 | Santen et al. |
| 5,347,938 | A | 9/1994 | Takazawa |
| 5,541,386 | A | 7/1996 | Alvi et al. |
| 5,657,706 | A | 8/1997 | Liagre et al. |
| 6,021,723 | A | 2/2000 | Vallomy |
| 6,200,475 | B1 | 3/2001 | Chen |
| 6,294,351 | B1 | 9/2001 | Lin et al. |
| 6,455,011 | B1 | 9/2002 | Fujimura et al. |
| 6,638,396 | B1 | 10/2003 | Hogan |
| 6,810,821 | B2 | 11/2004 | Chan |
| 2004/0159366 | A1 | 8/2004 | Tsangaris et al. |

(Continued)

FOREIGN PATENT DOCUMENTS

| | | |
|---|---|---|
| CA | 2339457 | 9/2002 |
| DE | 19745422 A1 | 4/1999 |

(Continued)

OTHER PUBLICATIONS

Abstract of DE19745422; Apr. 22, 1999.

(Continued)

*Primary Examiner* — Jennifer Smith
(74) *Attorney, Agent, or Firm* — Senniger Powers LLP (57) ABSTRACT

A process and related apparatus for the treatment of hazardous waste and an initially separate waste stream, the process comprising gasifying the waste stream in a gasification unit to produce an offgas and a char material; and plasma treating the offgas, and optionally the char material, in a plasma treatment unit to produce a syngas; and blending hazardous waste with the waste stream at a point in the process determined by the relative chemical and/or physical properties of the hazardous waste and the waste stream.

14 Claims, 1 Drawing Sheet

(56) References Cited

U.S. PATENT DOCUMENTS

| | | |
|---|---|---|
| 2007/0289216 A1 * | 12/2007 | Tsangaris et al. ........... 48/197 R |
| 2008/0097137 A1 | 4/2008 | Chapman et al. |
| 2008/0202028 A1 | 8/2008 | Tsangaris et al. |
| 2008/0277265 A1 | 11/2008 | Tsangaris et al. |

FOREIGN PATENT DOCUMENTS

| | | |
|---|---|---|
| EP | 0952393 A1 | 10/1999 |
| GB | 2169310 A | 7/1986 |
| JP | 2003147373 A | 5/2003 |
| RU | 2047650 C1 | 11/1995 |
| RU | 2171431 C1 | 7/2001 |
| WO | 2004060587 A1 | 7/2004 |
| WO | 2007012149 A1 | 2/2007 |
| WO | 2007012151 A1 | 2/2007 |
| WO | 2007/131235 | 11/2007 |

OTHER PUBLICATIONS

Abstract of RU2171431; Jul. 27, 2001.
Abstract of RU2047650; Nov. 10, 1995.
Abstract of JP2003147373; May 21, 2003.
Young, Gary C., "Municipal Solid Waste to Energy Conversion Process", John Wiley & Sons Inc., pp. 5-6, 2010.
International Search Report, PCT/GB2011/000699, dated Jul. 21, 2011, 4 pages.
Great Britain Search Report, GB1101382.8, dated Apr. 13, 2011, 1 page.

* cited by examiner

WASTE TREATMENT

FIELD OF THE INVENTION

The present invention relates to a process for treating waste, particularly hazardous waste.

BACKGROUND OF THE INVENTION

Municipal waste has traditionally been disposed of in landfill sites. However, the environmental hazards of doing so are becoming a major concern and therefore an effort has been made in recent years to develop waste-treatment processes that reduce the volume of the waste material and the amount of potentially environmentally hazardous constituents in the treated material.

EP1896774 discloses the treatment of such municipal waste in a two step process. Firstly, the waste is gasified in a gasification unit. Gasification, while being moderately successful in combusting the majority of waste, nevertheless produces a gas that contains uncombusted particulates, low volatility tarry species, airborne compounds and a solid non-airborne char.

The gas that results from the gasification of waste (termed an 'offgas') can be used in a gas turbine, but the airborne particulates and tarry hydrocarbon molecules have a tendency to clog the turbine or engine. EP1896774 therefore discloses a plasma treatment of the off-gas and the solid non-airborne char in a plasma treatment unit. This extracts any remaining organic species from the char, which it then vitrifies, and cracks any airborne organic species into carbon monoxide and hydrogen for use in a gas engine.

Gas engines are sensitive to the homogeneity of the syngas feedstock. Accordingly, the process disclosed in EP1896774 is preferably used to treat homogenised organic waste of constant calorific value (CV). Indeed, the process disclosed in EP1896774 is optimised for the treatment of Refuse Derived Fuel (RDF) and Solid Recovered Fuel (SRF), although treatment of any waste is contemplated.

Hazardous wastes come in many different forms, for example, tyres, paints and soil. Hazardous wastes have different calorific content and volatilities and therefore such wastes need to be recycled individually using specialist treatment methods.

Accordingly, there is a desire for a process that will overcome, or at least mitigate, some or all of the problems associated with the methods of the prior art or at least a useful or optimised alternative.

SUMMARY OF THE INVENTION

In a first aspect, the present invention provides a process for the treatment of hazardous waste, the process comprising:
(i) providing a hazardous waste;
(ii) providing a waste stream;
(iii) gasifying the waste stream in a gasification unit to produce an offgas and a char material; and
(iv) plasma treating the offgas, and optionally the char material, in a plasma treatment unit to produce a syngas;
wherein the hazardous waste is blended with the waste stream at a point in the process determined by the relative chemical and/or physical properties of the hazardous waste and the waste stream.

DETAILED DESCRIPTION OF PREFERRED EMBODIMENTS

The term "hazardous" waste as used herein is intended to include waste materials that are potentially harmful or detrimental to human health and/or the environment (whether organic or inorganic) and includes by way of example, commercial and industrial waste, contaminated wood waste, tyre derived fuel, auto shredder residue, contaminated food waste, solid resin, plastics, polymerised organics, oil-water emulsion or mixture, waste oil, lab packs, contaminated soil, dilute aqueous waste, filters (with solid adsorbents), ion exchange resins, spent carbon, contaminated debris, ash from waste incinerators, air-pollution control residues, sediment or lagoon dragout, drilling wastes, paint, ink, varnish, lacquer, reactive/polymerisable organic liquids, adhesives, paint thinner, petroleum distillates, still bottoms (in liquid or sludge form), concentrated solvent, paint sludges, ink sludge, oily sludge, halogenated solvent, compressed gases, pharmaceutical wastes, and clinical wastes.

Hazardous waste is commonly obtained in smaller quantities which need to be stored until a sufficient amount has been obtained to warrant processing. Depending on the properties of the waste this storage can present issues such as leakage or contamination. Alternatively, the small quantities can be treated on a case by case basis but this is often energy intensive and inefficient.

The present inventors have discovered that a process of gasification and plasma treatment of waste is sufficiently adaptable to be able to treat hazardous wastes as they are obtained. Furthermore, the process has the advantage that any hazardous residues are reduced. The present invention therefore provides a process for the treatment of hazardous wastes on a case by case basis that has a low energy cost and is adaptable to the specific waste to be treated.

The method of the present invention has been found to be surprisingly energy efficient. It has also been found that the combination of the gasification treatment and plasma treatment of a conventional waste stream with the treatment of varied hazardous wastes allows for the production of a useful, relatively clean syngas (containing very low concentrations of airborne particulates), very low amounts of hazardous tar and heavy metal species and smaller amounts of solid material in the cleaned gas product. The plasma also has the advantage that various environmentally harmful airborne particulates and gases are degraded to less harmful species during the plasma process. Furthermore, any residual hazardous material is trapped in the solid vitrified product.

Preferably the process further comprises a step of assessing the chemical and/or physical properties of the hazardous waste to determine at least one of:
(a) the most suitable blending ratio of the hazardous waste to the waste stream; and
(b) the most suitable point in the process at which to blend the hazardous waste and the waste stream.

The inventors have found that classifying the waste based on its physical and/or chemical properties allows them to determine the most suitable point in the process to introduce the waste. This assessment is a careful balance that includes consideration of the calorific value of the waste and its phase.

The term "waste stream" as used herein includes the raw waste source before gasification, the waste during gasification, the syngas and/or solid char material produced by the gasification and the syngas and/or solid char material during plasma treatment. That is, at any point in the treatment process of the present invention there is considered to be a waste stream passing through the apparatus. The syngas, although a commercially useful product, for example, is still considered part of the "waste stream" for the purpose of this invention. Thus, mixing the hazardous waste with the syngas can be considered to be mixing the hazardous waste with the waste stream post-gasification.

The waste can be mixed or blended with the waste stream at one of more of a number of places in the process. These include (a) before the waste stream is gasified, (b) after the waste stream is gasified and before it is plasma treated and (c) in the plasma treatment unit.

The inventors have found that solid organic hazardous waste benefits from being blended with the waste stream before the waste stream is gasified. This allows the hazardous waste to be gasified as well. The ratio of the hazardous waste to the waste stream is carefully controlled to ensure that the hazardous waste does not cause notable disturbance of the CV of the syngas produced by the process. Disturbances include an increase or a decrease in the outputted syngas CV.

The inventors have found that when the hazardous waste is liquid or gaseous waste it benefits from being predominantly blended with the waste stream after the waste stream is gasified and before it is plasma treated. This is because it is either already in gaseous form or can be quickly volatilised by the heat of the pretreated waste stream. Once again, the blending ratio and rate is controlled to prevent disturbance of the syngas produced.

The inventors have also found that for solid inorganic hazardous waste it is beneficial to predominantly blend it with the waste stream in the plasma treatment unit. This means that the solid inorganic waste is directly plasma treated and has little direct impact on the off-gas. Rather, the solid inorganic waste benefits from the co-treatment with the waste stream so that it becomes integrated in the vitrified waste that is produced.

When a large amount of a hazardous waste is to be treated, the inventors have found that the waste can be fed into the process in multiple places. This can allow for bulk material to be processed while maintaining fine control over the final syngas CV. Preferably the treatment of the waste stream is continuous and the introduction of hazardous waste is performed batchwise to allow this fine control over the outputted product.

The amount and form of hazardous waste that can be mixed with the waste stream as part of the process, and the optimum blending point, may be determined by considering one or more of:

The differing calorific value (CV) of the wastes compared to the waste stream. This has economic considerations around substitution quantities in respect of the charges which may be levied for treating the particular wastes;

continual variation in CV of the waste which would produce a variation in CV of the syn gas. As noted above, the gas engines operate within certain parameters needing consistency of gas CV;

other impurities that require additional clean up;

levels of volatile organic compounds (VOCs); and materials that are explosive or highly reactive in nature.

The waste stream is preferably municipal waste, SRF, RDF or a mixture of two or more thereof. Other similarly prepared waste sources are also contemplated. If municipal waste is used then it is preferred that this has been pre-treated to ensure that it has a substantially constant CV. Suitable pretreatment methods include sorting, picking, homogenising and microbial treatment. It is most preferred that the waste stream is predominantly Refuse Derived Fuel and/or Solid Recovered Fuel. These are commercially available and well known in the art.

The term waste feedstock as used herein is intended to encompass both the waste stream and combinations of the waste stream and one or more hazardous wastes.

The waste feedstock in the waste stream may have been pre-treated to increase its homogeneity prior to introduction to the gasification unit. "Homogenous" indicates that the waste should have one or more properties which do not vary to a great extent throughout the bulk of the waste or from batch to batch, if the waste feedstock is fed in batches to the gasifier; hence the value of the property in question does not vary to a great extent as the waste is fed to the gasification unit. Such properties that preferably do not vary to a great extent include the calorific value, the size of constituents, moisture content, ash content, and density of the waste material. Preferably one or more of these properties varies by 20% or less, preferably 15% or less, more preferably 10% or less. Preferably, the calorific value and the moisture content of the waste being fed to the gasifier are relatively consistent during the process.

The consistency of the property/properties of interest may be measured by taking samples of the same weight from either (i) a given number of batches of the feedstock fed to the gasifier over a period of time (if the feedstock is fed batchwise to the gasifier) or (ii) at given intervals of time if the feedstock is fed substantially continuously to the gasifier. Sampling methods known to the skilled person may be used to measure the consistency of the waste feedstock. Furthermore, the consistency of the processed material may be determined by taking samples from the gasifier, after the gasifier and/or before or after plasma treatment.

For example, over a period of 1 hour of running the process, the calorific value of samples of the waste (of the same weight, e.g. 1 kg or 10 kg) being fed to the gasifier taken at regular (e.g. 5 to 10 minutes or 3 to 4 hours) intervals preferably varies by 20% or less, more preferably 15% or less, most preferably 10% or less. On an absolute scale, the waste feedstock typically has a mean calorific value of around 15 MJ/kg, and preferably has a (+/−) variation from the mean calorific value of less than 3 MJ/kg, preferably less than 1.5 MJ/Kg. The moisture content of the waste feedstock is preferably as low as possible, as discussed in more detail below. The average (mean) calorific value of the waste feedstock (which may be calculated from a variety of samples taken at regular intervals, as described above) is preferably 11 MJ/Kg or above, more preferably 13 MJ/Kg or above, most preferably 15-17 MJ/Kg.

The waste feedstock preferably has a moisture content of 30% or less by weight, preferably 20% or less by weight. The moisture content of the waste feedstock preferably varies by 10% or less, more preferably by 5% or less. The moisture content of the waste feedstock may be controlled using processes known to those skilled in the art, such as drying, or by using the microbial digestion processes described herein.

The waste feedstock preferably contains a high proportion (preferably 85% or more of the number of particles, more preferably 95% or more of the number of particles) of particles having a particle size of 50 mm or less. A particle's size is measured across the particle at its largest dimension. Preferably the feedstock contains 50% or more (by number) of particles having a particle size of 30 mm or less.

A typical analysis of the waste feedstock content would be as follows:

Gross calorific value: 13.2 MJ/Kg

Moisture: 25%

Ash: 13.05%
Fixed carbon: 12.17%
Volatile matter: 49.78%
Particle size: 85%<50 mm Various processes may be used to homogenise various properties of the waste material, for example: microbial digestion, picking, shredding, drying, screening, mixing and blending. Of these, microbial digestion is preferred and this process is explained in more detail below.

According to a second aspect, the present invention provides an apparatus for carrying out the process of the present invention, the apparatus comprising:

(i) a gasification unit;
(ii) a plasma treatment unit, separate from the gasification unit; and
(iii) a conduit for establishing fluid communication between the gasification unit and the plasma treatment unit,
wherein the apparatus comprises air-lock means for:
(a) introducing hazardous waste into the gasification unit;
(b) introducing hazardous waste into the plasma treatment unit; and
(c) introducing hazardous waste into conduit.

Preferably one or more of the air-lock means comprises a means for blending the hazardous waste with the waste stream.

The gasification unit allows the waste stream to be gasified. Gasification is the partial combustion of a material, where the oxygen in the gasification unit is controlled such that it is present at a sub-stoichiometric amount, relative to the waste material. Gasification of waste containing carbonaceous components results in a combustible fuel gas rich in carbon monoxide, hydrogen and some saturated hydrocarbons, principally methane.

The steps of gasification and plasma treatment may each separately be conducted in the presence of oxygen and steam. This means that both oxygen gas and steam may be present in the gasification unit and/or the plasma treatment unit, which may or may not be in the presence of other gases.

Preferably the gasification unit has an inlet for oxygen and optionally an inlet for steam and the plasma treatment unit has an inlet for oxygen and optionally an inlet for steam. "Steam" includes water in the gaseous form, vapour and water suspended in a gas as droplets. Preferably, the steam is water having a temperature of 100° C. or more. Water, which will be converted to steam, may be introduced into the gasification unit and/or plasma treatment unit in the form of liquid water, a spray of water, which may have a temperature of 100° C. or less, or as vapour having a temperature of 100° C. or more; in use, the heat in the interior of the gasification unit and/or plasma treatment unit ensures that any liquid water, which may be in the form of airborne droplets, is vaporised to steam.

The process according to the present invention comprises a gasification step. The gasification step may, for example, be carried out in a vertical fixed bed (shaft) gasifier, a horizontal fixed bed gasifier, a fluidised bed gasifier, a multiple hearth gasifier or a rotary kiln gasifier.

It should be noted that a horizontal fixed bed gasifier may otherwise be referred to in the prior art as a starved air combustor (incinerator), controlled air combustor, pyrolytic combustor, or a modular combustion unit (MCU).

A horizontal fixed bed gasifier generally comprises two sections: a primary combustion chamber and a secondary combustion chamber. In the primary chamber, waste is gasified by partial combustion under sub-stoichiometric conditions, producing low-calorific gas, which then flows into the secondary combustion chamber, where it is combusted with excess air. The secondary combustion produces high-temperature (650 to 870° C.) gases of complete combustion, which can be used to produce steam or hot water in an optionally attached waste boiler. Lower velocity and turbulence in the primary combustion chamber minimize the entrainment of particulates in the gas stream, leading to lower particulate emissions than conventional excess-air combustors.

Preferably, the gasification step is carried out in a fluid bed gasification unit. Fluid bed gasification has been found to process the waste feedstock more efficiently than the other gasification processes available. The fluid bed technique permits very efficient contacting of the oxidant and waste feed streams leading to rapid gasification rates and close temperature control within the unit.

A typical fluid bed gasification unit may comprise a vertical steel cylinder, usually refractory lined, with a sand bed, a supporting grid plate and air injection nozzles known as tuyeres. When air is forced up through the tuyeres, the bed fluidises and expands up to twice its resting volume. Solid fuels such as coal or refused derived fuel, or in the case of the present invention, the waste feedstock, can be introduced, possibly by means of injection, into the reactor below or above the level of the fluidised bed. The "boiling" action of the fluidised bed promotes turbulence and transfers heat to the waste feedstock. In operation, auxiliary fuel (natural gas or fuel oil) is used to bring the bed up to operating temperature 550° C. to 950° C., preferably 650° C. to 850° C. After start-up, auxiliary fuel is usually not needed.

Preferably the gasification unit, most preferably the fluid bed gasification unit, will be a vertical, cylindrical vessel, which is preferably lined with an appropriate refractory material, preferably comprising alumina silicate.

In a fluid bed gasification unit, the distance between the effective surface formed by the particles of the fluid bed when fluid (i.e. when gas is being fed through the particles from below) and the top of the unit is called the "free board height". In the present invention, the free board height, in use, will preferably be 3.5-5.0 times the internal diameter of the unit. This geometric configuration of the vessel is designed to permit adequate residence time of the waste within the fluid bed to drive the gasification reactions to completion and also to prevent excessive carry over of particulates into the plasma unit. The gasification unit will preferably employ a heated bed of ceramic particles suspended (fluidized) within a rising column of gas. The particles may be sand-like.

Preferably, the waste will be fed continuously to the gasification unit at a controlled rate. If the gasification unit is a fluid bed gasification unit, preferably the waste is fed either directly into the bed or above the bed.

Preferably, the waste feed will be transferred to the gasifier unit using a screw conveyor system, which enables continuous addition of waste. The waste feed system may incorporate an air lock device, such that the waste can be fed into the gasification unit through the air lock device to prevent air ingress or gas egress to/from the interior of the gasifier unit. The waste is preferably fed through the airlock device with additional inert gas purging. Air lock devices are known to the skilled person.

During the gasification process, the gasification unit should be sealed from the surrounding environment to prevent ingress or egress of gases to/from the gasification unit, with the amount of oxygen and/or steam being introduced to the gasification unit as required in a controlled manner.

If the gasification unit is a fluid bed gasification unit, preferably oxidants comprising oxygen and steam are fed below the bed, which may be through a series of upward facing distribution nozzles.

The gasification may be carried out in the presence of steam and oxygen. As mentioned above, water, which will be converted to steam, may be introduced into the gasification unit in the form of liquid water, a spray of water, which may have a temperature of 100° C. or less, or as vapour having a temperature of 100° C. or more. In use, the heat in the interior of the gasification unit ensures that any liquid water, which may be in the form of airborne droplets, is vaporised to steam. Preferably the steam and oxygen will be closely metered to the unit and the rate of waste feed adjusted to ensure that the gasifier operates within an acceptable regime. The amount of oxygen and steam introduced to the gasification unit relative to the amount of waste will depend on a number of factors including the composition of the waste feed, its moisture content and calorific value. Preferably, the amount of oxygen introduced to the gasification unit during the gasification step is from 300 to 350 kg per 1000 kg of waste fed to the gasification unit. Preferably, the amount of steam introduced to the gasification unit is from 0 to 350 kg per 1000 kg of waste introduced to the gasification unit, more preferably from 300 to 350 kg per 1000 kg of waste if the waste contains less than 18% by weight moisture. If the waste contains 18% or more by weight moisture, preferably the amount of steam introduced to the gasification unit is from 0 to 150 kg per 1000 kg of waste. Typical addition amounts of oxygen and steam oxidants for the waste given above in Table 1 are given below in Table 3.

The gasification unit will preferably comprise a fossil fuelled underbed preheat system, which will preferably be used to raise the temperature of the bed prior to commencement of feeding to the unit.

Preferably the gasification unit will comprise multiple pressure and temperature sensors to closely monitor the gasification operation.

For the waste material having the composition given in Table 1 (containing either 12% or 25% water), the addition rate of oxygen and steam will preferably be in the range as indicated in Table 2 below.

TABLE 2

Typical relative addition amounts of oxygen and steam oxidants

|  | RDF 12% moisture* | RDF 25% moisture* |
|---|---|---|
| Relative oxygen addition amount (kg per 1000 kg waste) | 300-350 | 300-350 |
| Relative steam addition amount (kg per 1000 kg waste) | 120-300 | 0-150 |

*Based on composition of waste feed (the refuse derived fuel) given in table 1

Preferably the waste will be gasified in the gasification unit at a temperature greater than 650° C., more preferably at a temperature greater than 650° C. up to a temperature of 1000° C., most preferably at a temperature of from 800° C. to 950° C.

Fluid bed gasification systems are quite versatile and can be operated on a wide variety of fuels, including municipal waste and hazardous waste, such as sludge, biomass materials, coal and numerous chemical wastes. The gasification step of the process of the present invention may comprise using a suitable bed media such as limestone ($CaCO_3$), or, preferably, sand. During operation, the original bed material may be consumed, and may be replaced by recycled graded ash (Char) material from the gasification stage.

Preferably, the whole process is an integrated process, in that all the steps are carried out on one site and means are provided to transport the products from each step to the next. Each step is carried out in a separate unit. In particular, the gasification and the plasma treatment are carried out in separate units, to allow the conditions in each unit to be varied independently.

In an alternative embodiment, the plasma treatment may be conducted in two units to separately treat the solid char and the gasifier off-gas streams.

The process according to the present invention comprises a plasma treatment step. The plasma treatment is carried out in the presence of oxygen and steam, which together act as an oxidant. Preferably, the amount of oxidant is controlled. More preferably, the amount of oxidant is controlled such that that the gaseous hydrocarbons (including low volatility, tar products), the airborne carbon particulates, carbon contained in the char and part of the carbon monoxide is converted to carbon monoxide and carbon dioxide, preferably such that the ratio of the $CO/CO_2$ after the plasma treatment stage is equal or greater than the gas exiting the gasifier unit. Preferably, the plasma treatment is carried out on the char until substantially all of the carbon content in the char has been converted to gas or airborne species.

As mentioned above, water, which will be converted to steam, may be introduced into plasma treatment unit in the form of liquid water, a spray of water, which may have a temperature of 100° C. or less, or as vapour having a temperature of 100° C. or more. In use, the heat in the interior of the gasification unit and/or plasma treatment unit ensures that any liquid water, which may be in the form of airborne droplets, is vaporised to steam.

Preferably, the ratio of oxygen to steam is from 10:1 to 2:5, by weight.

Preferably, the plasma treatment of the waste is carried out at a temperature of from 1100 to 1700° C., preferably from 1300 to 1600° C.

Preferably, the plasma treatment of the waste is carried out in the presence of a plasma stabilizing gas. Preferably, the plasma stabilizing gas is selected from nitrogen, argon, hydrogen, and carbon monoxide.

Preferably, water, which will be converted into steam, is introduced into the plasma treatment unit in the form of a spray of water having a temperature below 100° C. There are two main advantages of doing so: firstly, the water in the spray has the effect of cooling the syngas produced in the plasma unit due to promotion of the endothermic reaction of water with carbon (to produce hydrogen and carbon monoxide). Secondly, the overall chemical enthalpy of the produced syngas is increased, allowing a greater export of electrical power if the gas is used to generate electricity. (i.e. giving an improvement in the overall net electrical conversion efficiency).

The plasma treatment step will provide a secure disposal route for residues produced by the process such a Flue gas cleaning residues.

The waste may contain constituents which contain hazardous compounds and elements, such as heavy metals, which are environmentally detrimental if airborne. These constituents, e.g. following gasifcation, may be termed APC (Air Pollution Control) residues and may be present in the offgas or syngas to an amount of about 0.2% by weight using the process of the present invention. As these residues may be contaminated with heavy metals such as lead, zinc and cadmium, they will be classified as hazardous. Preferably, the process of the present invention further comprises inclusion of hazardous inorganic materials, such as heavy metals and compounds containing heavy metals, into the slag phase of the plasma. This will trap the hazardous materials in an inert non-leachable slag as an inert waste, thus providing a long-term solution for the disposal problem for these materials. In one embodiment, these APCs may be recycled back into the plasma treatment unit to be vitrified for disposal.

The process may further comprise addition of one or more fluxing agents such as lime, alumina or silica sand to the plasma unit before or during plasma treatment of the offgas and char. The advantage of adding a fluxing agent is that in certain situations, it would ensure that a low melting point, low viscosity slag was produced from the inorganic, non-combustible materials. A fluxing agent such as silica sand, alumina or lime may also be used to immobilize heavy metal species. These fluxing agents are preferably added to the char prior to introduction of the char to the plasma unit, and if the process is a continuous process, the additions may be made to the char stream.

The throughput and chemistry of the gas and char reactants entering the plasma unit are preferably maintained under steady state conditions. This should be achievable by the close control of the feed preparation system and primary gasifier upstream of the plasma unit.

The type, proportion and total addition rates of oxidant to the plasma unit will be closely controlled and will take account of a number of factors:
- the throughput and chemistry of both the char and gas reactants;
- the knowledge that the addition of steam as an oxidant is effective in ensuring rapid reaction rates with the pyrolysed solid char and soot products in the gas phase. It can help control the thermal stability of the plasma unit, avoiding the possibility of thermal "runaway";
- the addition of oxygen generates heat as a result of the exothermic (partial) combustion reactions that occur;
- steam is used in combination with oxygen or oxygen enriched air for reasons of economy, efficacy of gasification of the char, destruction efficiency of the organics, quality and calorific value of the gas product and overall controllability of the process;
- air may be used either in combination or as an alternative to oxygen. Although air is inexpensive to use, it is thermally less efficient than oxygen, produces a much lower calorific gas product (due to the dilution effect of nitrogen) and may generate NOx as a by-product; and
- the overall process economics, (which will be sensitive to local factors).

If the chemical composition and mass throughput of the reactants are generally constant, then the ratio of oxidant to the reactant streams (containing the waste) will also preferably be maintained at a constant value. An increase in the feed rate of the reactants will preferably lead to a proportionate increase in the oxidant addition rate, which may be controlled by automatic oxidant addition means. The electrical power supplied to the plasma will also preferably be adjusted to match the change in the feed rate of the waste to the plasma unit and will take account of the thermo-chemistry of the system and the thermal losses from the unit.

Preferably, the gas produced from the gas plasma treatment is used in a turbine or gas engine to generate electricity. The turbine may be a conventional boiler steam turbine or gas turbine. The syngas resulting from the plasma treatment process is preferably cooled or allowed to cool to a temperature of from 250 to 20° C. prior to use in a turbine. This allows the partially combusted components of the gas, e.g. carbon monoxide, to be combusted completely and efficiently. Additionally, if the syngas from the plasma treatment is cooled using a heat exchange system which transfers the heat to another (heat transfer) gas, preferably the heat transfer gas is used to heat a steam turbine for additional power generation.

The plasma unit preferably comprises a stainless or carbon steel welded shell lined with high grade refractory lined bricks.

Preferably, the plasma unit comprises remote water cooled copper elements, which will preferably be employed to effectively contain the molten inorganic phase(s). These elements preferably act to form a protective frozen melt layer on the hot face refractories to promote good refractory performance.

Preferably, the gasifier comprises an exhaust gas port in fluid connection with the plasma unit. Preferably, the exhaust gas port in the gasifier will be closely coupled to the plasma unit to prevent condensation of tar or volatile salts in the channel connecting the two units.

Preferably, the plasma unit comprises either a single or twin graphite electrode system to generate the plasma arc. Preferably, the graphite electrode(s) will be drilled, and a plasma stabilizing gas (eg those mentioned above) will be injected down the centre of the electrode(s).

Optionally, the electrodes are coated with a refractory material (eg alumina coating) in order to reduce the wear of the electrode.

Optionally one or more water-cooled plasma torches may be used to generate the plasma.

The plasma unit may comprise one or more feed ports for the introduction of the char residue from the gasification process. Preferably, the char residue is introduced into the plasma unit via one or more feed ports in the roof of the unit. The feed ports will preferably be located remotely from the slag removal spout.

The plasma unit may comprise one or more gas entry feed ports for the introduction of the offgas into the plasma unit; the feed ports may be located in a sidewall or the roof of the plasma unit. The tar-laden gas (the offgas) from the gasifier will preferably enter the plasma unit either through a port in the sidewall or roof. Preferably, the plasma unit will be designed to prevent or minimise short circuiting of the dirty gas, for example:
- preferably, the point of exit for the reformed gas (the syngas) will be diametrically opposed and as remote as practical to the point of entry of the gases and/or
- the offgas will preferably be forced downwards in the plasma unit (eg either by flow direction devices or else by locating the exhaust port at a lower level than the gas entry point thereby reducing the buoyancy effect of the gases.)

The plasma unit will be designed to ensure adequate residence time for both the char and gas reformation reactions to occur.

The oxidant may be injected into the plasma unit to enable the gasification of the carbon component of the char and reformation of the dirty, tar-laden gas stream (the offgas) from the gasifier unit.

The oxidant injection point will preferably be remote from the electrodes to prevent high graphite wear rates.

The plasma unit may comprise separate and multiple points of injection for the oxidant, ideally at least one for injection point for the offgas and at least one injection point for the char residue. Alternatively, the char and offgas may be introduced through a single point of injection.

An injection means may be provided in the plasma unit for the injection of the oxidant and the injection means is preferably such that when injected a radial flow of oxidant will result. This would improve the contacting between the oxidant and reacting "fuel" phases (i.e. the offgas and the char).

The char may contain an inorganic fraction, i.e. solid components containing elements other than carbon. The inorganic fraction of the char will form a molten complex oxide "slag" phase that, preferably, will be continuously removed from the plasma unit. The unit may therefore comprise a means for removing the slag phase, which may be in the form of a slag overflow spout angled upward (toward the exterior of the unit), so the molten slag exiting the plasma unit will create an airlock to prevent either air ingress or gas egress from the unit.

During use, the plasma unit will preferably be tightly sealed. The unit will preferably be maintained under positive pressure.

Preferably, a gas tight, bolted flange will be used to seal the roof to the main furnace body section. Preferably, the flanged bolts will be spring-loaded to ensure that in the unlikely event of high overpressure in the plasma unit, (eg as a result of an explosion) the roof will be raised to allow rapid dissipation of pressure. The escaping gases will be safely handled via a fugitive emissions handling system.

The presence of carbon soot or other conductive deposits in the unit may encourage the generation of side-arcs (also referred to as parasitic arcs) which emanate from the electrode(s) and transfer to the roof or the sidewalls of the unit rather than to the melt. Side-arcs tend to be destructive, leading to premature failure of the reactor shell. A number of measures may be in place to prevent side-arc development from occurring:

- preferably, the roof of the plasma unit will be constructed in sections which will be electrically isolated from each other.
- Close attention will be paid to the design of the electrode seal to avoid the possibility of electrical tracking to the roof. All holding bolts, securing the seal will preferably be electrically isolated and, preferably, dust protected to avoid build-up of dust on electrically conductive surfaces.
- Gas purging will preferably be employed around the outside of the electrode(s) to prevent the build-up of deposits on surfaces that are in close proximity to the electrode.
- The unit is preferably adapted in a way that will minimize the production of soot or tarry products
- All seals will be designed to be easy to clean and/or replace if required.

The off-gas composition will preferably be continuously monitored and a feed back control loop may be employed to adjust the power and oxidant feed rate to the plasma unit.

The reformed gas (syngas), which results from the plasma treatment, will preferably be further cleaned to remove acid gases, particulates and heavy metals from the gas stream to produce a fuel that can be use in the generation of electricity and heat for steam raising.

Optionally, the apparatus may further comprise a pyrolysing unit. This can be used before the gasification unit to pre-treat the waste stream.

The apparatus may further comprise a unit for the aerobic microbial digestion of waste which may be as described herein.

As mentioned above, the process preferably further comprises subjecting the waste to microbial digestion, more preferably aerobic microbial digestion, prior to the gasification step. This has the added advantages of producing a more homogenous feedstock with a higher calorific content and less moisture content than unprocessed waste, which allows for a much more efficient combined gasification and plasma process. The gasification process is far more efficient with a feedstock of relatively consistent calorific value. Likewise, it has been found that an efficient plasma treatment should ideally have a relatively homogenous feed of offgas. By treating the waste initially with a microbial treatment to homogenise the waste introduced to the gasifier, the resultant offgas from the gasifier is also more consistent in calorific value and hence the process as a whole is more efficient.

Preferably, the aerobic microbial digestion is carried out in a rotary aerobic digestion unit.

Preferably, the waste is rotated in the rotary aerobic digestion unit at a rate of from one revolution every minute to one revolution every ten minutes.

The moisture content of the waste prior to aerobic digestion may be from 20 to 75% by weight, preferably 25 to 50% by weight.

Preferably, the waste has an average moisture level of 45% or less, preferably 30% or less, after the aerobic digestion treatment.

The microbial digestion step preferably comprises the steps of:

mixing a (first) supply of waste having a first average moisture level before treatment with a supply of other waste, having a lower average moisture level before treatment, wherein the relative quantities by weight of the first waste and the other waste are controlled, feeding the mixed waste into a microbial treatment vessel, treating the waste by microbial activity in the treatment vessel, the mixed waste being agitated during treatment, the oxygen content in the gas in contact with the mixed waste being controlled during the treatment process so that it does not fall below 5% by volume, the mixed waste having an average moisture level after treatment not exceeding 45% by weight, more preferably not exceeding 35% of weight and most preferably not exceeding 25%.

Subsequent drying of the product to an average moisture content of below 20% by weight can be carried out relatively easily. Preferably, the first supply of waste comprises organic waste, preferably solid organic waste. The other waste may comprise solid waste.

The part of the apparatus of the present invention for carrying out the microbial digestion preferably comprises:

a supply for a first waste having a first average moisture level before treatment and a supply for other waste having a lower average moisture level before treatment, means for mixing the first waste and the other waste, control means for controlling the relative quantities by weight of the first waste and other waste mixed together, means for feeding the first waste and the other waste to a treatment vessel, means for agitating the solid organic waste in the treatment vessel, drying means following the treatment vessel and means for controlling the air flow through the treatment vessel, and/or the input of first waste and other solid waste to the treatment vessel, so that the average moisture level of waste after treatment does not exceed 45% by weight, more preferably not exceeding 35% by weight and most preferably not exceeding 35% by weight, and so that the oxygen content of gas in contact with the mixed waste in the vessel does not fall below 5% by volume.

Variations in the physical composition (for example calorific content) and moisture level of the first waste (typically domestic waste, but also possibly agricultural waste) can be 'smoothed out', so that a product formed from treated waste from different areas or different time periods can be relatively homogeneous.

The waste, either the first and/or the other waste, treated using the microbial step is preferably "organic waste", preferably solid organic waste, for example domestic waste, industrial waste or agricultural waste. "Organic waste" is waste that has at least a proportion of organic material capable of being treated microbially. The other waste mixed with the first waste preferably also contains organic material.

By, "mixing" it is meant that at least two separate sources of waste are collected and fed into the microbial treatment vessel in controlled relative quantities by weight. The waste from the two different sources may be mixed in a mixing device or in a shredder or they may be mixed during agitation in the treatment vessel.

The microbial digestion step will preferably produce heat. This breakdown is accelerated by changes in the physical nature of the waste. Typically, the microbial activity is bacterial activity. Preferably, the microbial activity is aerobic.

The microbial digestion process is preferably carried out using bacteria in the thermophilic phase, which normally occurs in the temperature range 60° C.-75° C., most preferably around 63° C.-70° C. In this phase, very rapid digestion occurs with the production of heat. It is found that the reaction in the thermophilic phase is much quicker than the commonly used mesophilic phase which occurs in the range 30° C.-38° C.

Accordingly, accelerated decomposition of the waste takes place. However, if the temperature rises above 75° C., there is a danger that the bacteria will be destroyed.

The microbial reaction in the thermophilic phase results in the natural generation of heat which breaks down the waste to produce a material which is suitable for processing to provide a fuel or compost. The microbial reaction will almost always provide sufficient heat to maintain itself without provision of supplementary heat. However, in practice, chemical mixing of the waste can lead to an increase in temperature which assists the commencement of the microbial activity.

Other material may be added to the microbial treatment vessel, for example quicklime, to control pH.

Preferably the oxygen level in the gas which is in contact with the waste being treated in the microbial digestion step does not fall below 5% by volume.

The treatment vessel for carrying out the microbial digestion is not normally filled completely, so there is a gas space above the waste being treated. The oxygen content in this gas space is suitably measured and preferably controlled. The skilled person will be aware of suitable techniques for measuring and controlling oxygen content. The moisture level may also be measured, as described below.

Preferably, the oxygen content (and, optionally moisture level) of gas removed from the treatment vessel (as will be described further below) is measured. This is a particularly convenient arrangement.

The gas in the microbial treatment vessel will typically comprise atmospheric nitrogen, oxygen, carbon dioxide and water vapour. This gas may contain no methane, ammonia or hydrogen sulphide, as the microbial activity is carried out in the thermophilic phase.

In order to maintain the oxygen level above 5% by volume, air or oxygen can be supplied to the treatment vessel. Air or oxygen can be supplied continuously throughout at least part of the process or in discrete inputs of air/oxygen.

In order to replace the oxygen which promotes aerobic digestion and to control moisture level in the exit gas, (the gas exiting the microbial treatment vessel) a relatively high airflow rate is required.

The air can be supplied by some form of forced draught. For example, a fan may be provided. The fan may blow air into the microbial treatment vessel. However, it is preferred that there is a fan to draw gas out of the microbial treatment vessel. Where extraction means are provided for withdrawing gas from the microbial treatment vessel, it may be replaced by air supplied through at least one duct. Air can be supplied to the microbial treatment vessel intermittently, but it is preferably supplied substantially continuously. The microbial treatment vessel may not be substantially sealed, so that as long as gas is removed, air will naturally flow in through openings to replace the gas removed.

As fresh air is supplied to the microbial treatment vessel and as gas is removed from this vessel, water vapour will be removed from the waste. This helps to control the drying effect, leading to a product having an average moisture level within the desired range.

Air supplied to the microbial treatment vessel may be previously dried by any suitable apparatus, to maximise the drying effect.

According to a preferred aspect of the invention, the moisture level in the gas in contact with the waste in the microbial treatment vessel is maintained at a level below its dew point. This ensures that water is substantially continuously removed from the waste being treated into the gas space by evaporation.

Means may be provided in the microbial treatment vessel for monitoring the moisture level in the gas space. Any suitable means may be employed for measuring the moisture level.

The moisture level in the microbial treatment vessel may be maintained below the dew point by supplying air which has a moisture level below the dew point of the waste being treated at the temperature of treatment. As the temperature of the microbial digestion will be typically higher than ambient temperature, normal fresh air may be used. Alternatively, dried air, having a moisture level below the moisture level of ambient air, may be used. The main process features which maintain the oxygen level within the required range can also be used to maintain the moisture level within the required range.

The flow of air and gas through the microbial treatment vessel also removes heat from this part of the apparatus. It is found that an adequate heat balance can be achieved. That is, heat generation by the microbial activity within the concentrated mass of waste can be balanced with heat removal by the gas flowing through the vessel so that the temperature is maintained at a desirable level.

Preferably, the waste should be agitated during the microbial digestion. This provides further breakdown of the waste and mixing to ensure that microbes are spread throughout the material. It also exposes different parts of the waste to the gas to ensure access of oxygen to the waste and drying of the waste by the gas. Agitation may take place by any suitable means, but it is particularly preferred that the digestion takes place in a rotary aerobic digestion unit, i.e. a unit containing a rotating aerobic drum.

The drum may be rotated at any suitable rate, and suitably completes one revolution in a time range of 1 minute to 10 minutes, preferably 2-5 minutes, most preferably about 3 minutes. However, a higher rate of rotation may be used during loading and unloading of waste into/out of the microbial digestion unit, in order to assist these operations. Typically, the speed can be increased to one revolution per minute during loading and unloading.

As will be described further below, the drum is suitably simultaneously loaded with waste at one end and unloaded with microbially treated waste at its other end. Loading and unloading typically take place at 4 hourly intervals and can take 30 minutes.

The drum preferably comprises a substantially parallel sided circular section cylinder. The axis of the cylinder may be inclined to the horizontal, for example at an angle in the range 3°-10° most preferably 5°-8°, to provide gravitational flow through the drum.

Any suitable size of drum may be provided, depending upon the rate of consumption of waste. It has been found that, for a processing rate of about 250-500 tonnes per day, a drum of diameter in the range 3.5-6 m, preferably 4-6 m most preferably around 5.5 m should be used. The length should be in the range from 6 to 10 times the diameter, most preferably about 8 times the diameter, suitably up to 40 m.

The drum may be used of any suitable material, for example mild steel.

A rotary drum has the advantage that it is mechanically simple. There are relatively few problems of blocking and very few moving parts, which reduces the risk of breakdown.

The agitation caused by the rotation leads to attrition of the waste, further contributing to its breakdown. Preferably, the drum is filled to a high level with waste, being preferably initially 75% to 90% full by volume. This leads to increased attrition, rapid heat generation and also to efficient use of microbial treatment vessel.

Average residence time of the waste in the microbial treatment vessel is suitably in the range 18-60 hours, more preferably around 24 to 48 hours, most preferably around 36 hours.

The microbial treatment vessel preferably comprises a vessel through which the waste is moved during treatment, for example a drum as described above. The waste suitably moves from a loading point to an unloading point within the drum. As noted above, loading and unloading suitably occur substantially simultaneously, with fresh (microbially untreated) waste being loaded at the loading end and mixed solid treated waste being removed at the unloading end. The loading and/or unloading operation can take 10-40 minutes, preferably about 30 minutes.

One unloading operation or loading operation is preferably spaced from the following unloading or loading operation respectively by a period in the range 2-8 hours, preferably 3-5 hours, most preferably around 4 hours. In this way, a "semi batch" process can be carried out.

During processing, it is found that the volume of the material may decrease by as much as 25%. The gas space over the material will accordingly increase.

The waste material should be discharged from the treatment vessel at a stage at which the treated waste material is sufficiently digested and sufficiently dry. This typically occurs after a period of about 48 hours. By restricting residence time to 48 hours or less, additional loss of carbon can be reduced.

It has been found that microbial treatment is effective in reducing the size of some constituents of the waste. Nevertheless, further processes to assist size-reduction of the waste constituents may be used. For instance, in order to promote the microbial activity, some parameters of the waste fed to the digestion step are preferably controlled. For example, the waste is preferably treated in a first process before the digestion step (or the gasification step, if the process does not include a microbial treatment step) to remove particles of size in excess of 100 mm, preferably 60 mm, more preferably 50 mm. This first process may comprise a first step in which very large objects are removed, for example by hand or by sieving and a second step in which the remaining material is treated to reduce its particle size, for example by shredding. The person skilled in the art will be able to obtain suitable shredding apparatus. Shredders can either have one fixed rotor or two counter-rotating rotors.

Alternatively, (prior to the microbial or gasification step), the waste may be subjected to an operation to reduce its particle size, for example by shredding without initially removing oversized particles. The shredding operation is particularly beneficial for the microbial treatment process, as it mixes the material thoroughly, spreading the microbial culture throughout the material and initiates a thermophilic reaction very quickly. Shredding may be used to reduce the spacing between the particles to promote the microbial reaction.

The second parameter which may be controlled is the average moisture content of at least some of the waste treated in the microbial treatment step. The average moisture level of this part of the waste is suitably in the range 20-75%, more preferably 30 to 60%, most preferably 30 to 50%.

All moisture levels quoted herein are % by weight. They are average values, being averaged for quantities of at least 100 kg of waste.

Moisture levels of waste may be measured by measuring the moisture level of air or gas over the waste at a fixed temperature and in equilibrium with it.

If the waste after mixing is low in organic content or moisture level, process water may be preferably added in controlled quantities. This process water is preferably waste water from water treatment, most preferably dewatered sewage sludge. This material has a high nitrogen content and acts as a catalyst for the microbial reaction.

As mentioned above, a desirable moisture level of the waste treated in the microbial treatment step may be obtained by blending a first waste with other waste of a lower average moisture level. It is found that mixed domestic waste typically has a moisture level in excess of 30% by weight. Commercial waste from offices and factories is typically drier, having a moisture level in the range 10%-30% by weight.

The moisture level of waste fed to the digester may be manipulated by altering the mixing ratios of different types of waste. Preferably at least part of the waste fed to the microbial digester has a moisture level in the range 20-75% by weight, preferably 25 to 65% by weight in order to promote the faster thermophilic reaction. However, part of the waste fed to the digester may comprise a relatively dry commercial waste. The heat generated by the digestion of the moist waste is sufficient to treat the whole of the waste fed to the treatment vessel. However, during the agitation process, the commercial and domestic waste are slowly mixed together reducing the overall moisture content of the mixture, so that at the end of the processing, the moisture level does not exceed 45% by weight and preferably does not exceed 25% by weight.

The first waste with higher moisture level may be blended with other waste with lower moisture level in blending apparatus in a controlled manner. The relative quantities of different types of waste are controlled so that the desired average moisture level over the combined masses of mixed wastes is obtained as explained above.

The blending step also allows absorbent material such as paper and paper based material (which is particularly common in commercial waste) to be blended intimately with the moist waste (such as domestic waste). The absorbent material absorbs liquid rich in bacteria, providing a substrate for the bacteria to grow on and allowing the bacteria to be spread throughout the waste being processed. This promotes reaction and mixing, leading to an improved digestion. Further, the wetting of the paper helps it to be broken down.

In processing the waste in the microbial treatment step, it is desirable to produce a product which is substantially homogeneous, such that its constituents are particles have a relatively small size distribution, the particles have a largest measurement of 50 mm or below. The blending step helps to improve the homogeneity of the product.

However, although blending takes place, it is found that the moisture level remains concentrated in local areas of the waste, where it is sufficiently high to allow the thermophilic reaction to commence and proceed very rapidly.

The relative quantities of different types of waste feed can be controlled using automatic weigh feeders.

By way of example, the moisture level of the waste during the microbial treatment may be as follows:

Domestic waste with a high organic content and moisture level above 50% can be mixed with commercial waste having a moisture level of 20% or below in a suitable ratio to provides a blend having an average moisture level in the range 45 to 55% by weight.

During microbial digestion, a part of the moisture is absorbed by the gas and air flowing over the material being processed. The average moisture level may drop to around 30-40% by weight, preferably 25 to 30% by weight.

During emptying of the microbial treatment vessel, the waste which still has a high residual heat level, may be dried by a forced draught as described above, so that the moisture level drops to the range 30-40% by weight, preferably 25 to 30% by weight.

The waste treated in the microbial digestion step may then be further dried on a drying floor as described above, so that the moisture level drops to below 25% by weight.

A further parameter which may be manipulated is the pH of the waste in the microbial treatment process. This pH of the waste in the microbial treatment process is preferably of from 6.0 to 8.5, preferably 6.3 to 7.3, most preferably around 6.8.

Nitrogen level has an impact on microbial activity, and adjustment of pH and nitrogen content can be advantageous.

It has been further found that the density of the waste fed to the microbial treatment vessel is suitably not too low. Preferably, the density is not less than 450 g per liter, preferably not less than 750 g per liter. Again, the blending step is particularly useful here. Domestic waste can have a relatively high density. The average density can be controlled by admixing a suitable quantity of commercial waste, which has a comparatively low density.

Preliminary Treatment

As described above, the waste may be subjected to various types of treatment before the gasification or microbial digestion step ('previous steps'). Preferably, the previous steps include any or all of the following:

1. Picking

Initial treatment to remove objects which are not readily combustible, such as stone, concrete, metal, old tires etc. Objects having a size in excess of 100 mm or more may also be removed. The process can be carried out on a stationary surface, such as a picking floor. Alternatively or additionally, the waste may be loaded onto a moving surface such as a conveyor and passed through a picking station in which mechanical or manual picking of the material takes place.

2. Shredding

Shredding is a highly preferred step. It is carried out to reduce the average particle size. It can also be used to increase blending of waste from different sources. It also makes the treatment process more effective. It is found that, during the shredding process, microbial activity may commence and rapidly raise the temperature passing very quickly through the mesophilic phase into the thermophilic phase.

3. Screening

The waste may be mechanically screened to select particles with size in a given range. The given range may be from 10 mm to 50 mm. Material less than 10 mm in size comprises dust, dirt and stones and is rejected. The waste may be treated to at least two screening processes in succession, each removing progressively smaller fractions of particles. Material removed in the screening process as being too large may be shredded to reduce its average size. Material which is classified by the screen as being of acceptable size and, where applicable, shredded material can then be fed to the treatment vessel.

Subsequent Treatment

The waste may be subjected to a number of steps after the microbial digestion treatment step and before the gasification step. These steps may include any of the following:

1. Grading

The material may be screened to remove particles in excess of a given size. For example, particles in excess of 50 mm may be rejected. They may be subsequently shredded to reduce their size, returned to the aerobic digester or simply rejected.

2. Metal Separation

Relatively small metal particles such as iron or aluminium may have passed through the system. They can be removed, for example by a magnetic or electromagnetic remover in a subsequent step. Metal particles removed from the system may then pass to a suitable recycling process.

3. Drying

Suitably, after treatment in the microbial treatment vessel, the waste is subjected to an additional drying step. If the moisture level does not exceed 45% by weight, more preferably does not exceed 35% by weight and most preferably does not exceed 25% by weight, after the microbial treatment, the subsequent drying can be carried out relatively simply. For example, in a first drying stage, a forced draught of air may be provided during or after the unloading phase from the treatment vessel. During this stage, the waste treated by the microbial digestion stage will still be at high temperature (for example in the range 50-60° C.) and further moisture can be removed simply by forcing air over it. A further drying step may comprise laying the material out on a drying floor. In this step, waste is laid out at a thickness of not more than 20 cm over a relatively large area for a suitable period of time, during which the moisture level drops. The waste may be agitated, for example by turning using mechanical or manual apparatus such as a power shovel. The waste may be turned at intervals of for example of 2-4 hours preferably around 3 hours. Preferably, during this stage, the moisture level drops to below 25% by weight after which no further biological decomposition occurs. Suitably, the waste is left on a drying floor for a period in the range 18-48 hours, preferably 24-36 hours, more preferably around 24 hours. It is also found that further drying may take place during subsequent processing, due to the mechanical input of energy. Waste heat from other process equipment, for example from the gasification and/or the plasma treatment step, may be used to dry the material. Air warmed by the heat generated in the gasification and/or plasma treatment steps may be blown into the microbial waste treatment vessel and over or through the waste to increase the drying rate of these processes.

Alternatively, the drying apparatus may comprise a rotary flash drier or other drying device.

4. Pelletising

In order to convert the treated waste to fuel, the waste may be classified according to size and subsequently densified to provide pellets of suitable size for use in the gasification step. During this pelletisation stage, further drying of the waste may occur, due to heat generation caused by friction and due to further exposure to air. Preferably, in order for pelletising to proceed well, the moisture level of the treated material is in the range 10-25% by weight.

It has been found that the microbial treatment step can be adapted to provide a fuel for use in the gasification step, referred to as Green Coal, which has a calorific value in the order of 14.5 MJ/kg which is about half that of industrial coal.

By blending different sources of waste material, fuel produced by the microbial treatment step at different times or with waste from different locations can be relatively homogeneous in terms of:

1. Calorific value—suitably in the range 13 to 16.5 MJ/kg, preferably 12-15 MJ/kg. The calorific value may be higher if the contents have been significantly dried.

2. Density—suitably in the range 270-350 kg/m$^3$ more preferably around 300 kg/m$^3$.

3. Moisture level—below 30% by weight and preferably around 20% by weight.

The process of the present invention may comprise a pyrolysis step prior to the gasification step, and after the microbial digestion step, if used. The waste that results from the microbial digestion step may be used to supply a feed to a pyrolysis process, as described below.

The apparatus of the present invention may include means for feeding microbially treated waste from the treatment vessel to a means for pyrolysing the treated waste (i.e. a pyrolysis unit).

If the process involves a pyrolysis step prior to the gasification step, preferably the pyrolysed waste is fed to the gasification unit, where the gasification takes place. This will normally require the pyrolysed material to be at a high temperature and the gasification process preferably occurs directly after the pyrolysis process.

As the microbial digestion step is typically carried out in a semi batch-wise fashion, whereas the pyrolysis and gasification processes typically require a continuous feed of material, an interim storage means, for example in the form of a feed hopper may be provided. It is preferred that there is a first delivery means for receiving treated waste from the microbial treatment process and feeding it into the interim storage means and a second feed apparatus for feeding the stored treated waste from the interim storage means to the pyrolysis apparatus or the gasification apparatus. The second feed means is preferably operated substantially continuously. The first and second feed apparatus may comprise any suitable means, for example conveyor belts or screw feeders.

The apparatus may further comprise a gas engine or gas turbine for generating electricity, the gas engine or turbine being in fluid connection with the plasma unit, so that the plasma-treated gas from the plasma unit can be fed to the gas engine or gas turbine.

The invention will now be discussed further with reference to the figures, provided purely by way of example.

Figure 1:
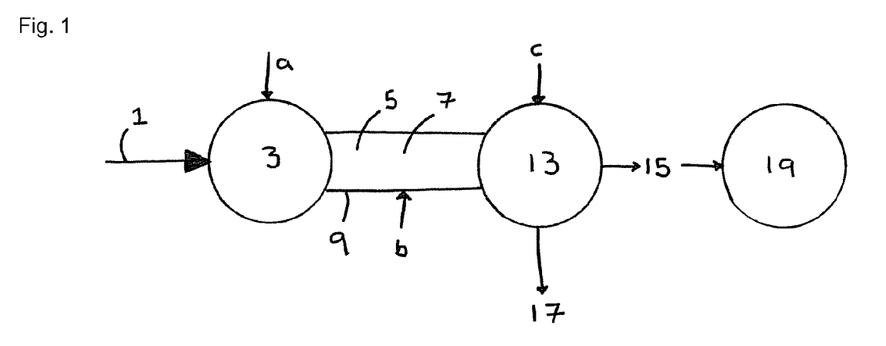
FIG. 1 shows a layout of the apparatus which may be used in the present invention.

As shown in FIG. 1, an RDF waste source 1 is subjected to an initial pretreatment step (optional) which involved homogenisation. The RDF was then passed in a continuous process into a gasification unit 3 where it was gasified at a temperature of approximately 800°. The gasification process produced an offgas 5 and a solid non-airborne char 7 which were passed from the gasification unit 3 within an airtight conduit 9 with a conveyor belt 11 (not shown) to a plasma treatment unit 13.

In the plasma treatment unit 13 the offgas 5 and a solid non-airborne char 7 were plasma treated in the presence of oxygen and steam to form a syngas 15 and a solid vitrified waste 17. The syngas 15 was passed to a gas turbine 19 for energy production.

A hazardous waste material 21 (not shown) was obtained in a batchwise manner. It was assessed in parallel with the processing of the RDF waste source 1 to determine where it should be blended in. Accordingly, the hazardous waste material 21 was blended into the process by passing it through an airlock at a, b, or c depending on the hazardous waste material's 21 characteristics.

Figure 2:
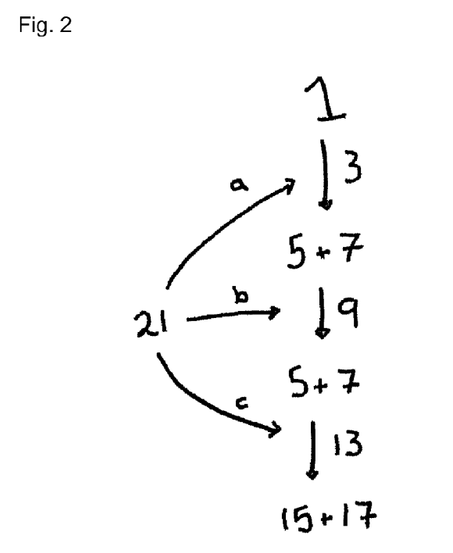
FIG. 2 shows a flowchart of the steps in the process of the present invention.

As shown in FIG. 2, the refuse derived fuel 1 is gasified to produce an offgas 5 and a solid non-airborne char 7. These are plasma treated to produce a syngas 15 and a vitrified solid 17. The hazardous waste material 21 is assessed and introduced into the process. Accordingly, the hazardous waste material 21, once treated, will form part of at least one of the offgas 5, the solid non-airborne char 7, the syngas 15 and the vitrified solid 17.

The foregoing detailed description has been provided by way of explanation and illustration, and is not intended to limit the scope of the appended claims. Many variations in the presently preferred embodiments illustrated herein will be apparent to one of ordinary skill in the art, and remain within the scope of the appended claims and their equivalents.

The invention claimed is:

1. A process for the treatment of hazardous waste, the process comprising:
   (i) providing a hazardous waste;
   (ii) providing a waste stream;
   (iii) gasifying the waste stream in a gasification unit to produce an offgas and a char material; and
   (iv) plasma treating the offgas, and optionally the char material, in a plasma treatment unit to produce a syngas;
   wherein the hazardous waste is blended with the waste stream at a point in the process determined by the relative chemical and/or physical properties of the hazardous waste and the waste stream, and wherein the hazardous waste stream is blended with the waste stream after the waste stream is gasified and before it is plasma treated, or in the plasma treatment unit.

2. A process according to claim 1, wherein the waste stream comprises Refuse Derived Fuel and/or Solid Recovered Fuel.

3. A process according to claim 1, wherein the process further comprises a step of assessing the chemical and/or physical properties of the hazardous waste to determine at least one of:
   (a) the most suitable blending ratio of the hazardous waste to the waste stream; and
   (b) the most suitable point in the process at which to blend the hazardous waste and the waste stream.

4. A process according to claim 2, wherein the process further comprises a step of assessing the chemical and/or physical properties of the hazardous waste to determine at least one of:
   (a) the most suitable blending ratio of the hazardous waste to the waste stream; and
   (b) the most suitable point in the process at which to blend the hazardous waste and the waste stream.

5. A process according to claim 1, wherein the hazardous waste is liquid or gaseous waste and is predominantly blended with the waste stream after the waste stream is gasified and before it is plasma treated.

6. A process according to claim 3, wherein the hazardous waste is liquid or gaseous waste and is predominantly blended with the waste stream after the waste stream is gasified and before it is plasma treated.

7. A process according to claim 1, wherein the hazardous waste is solid inorganic waste and is predominantly blended with the waste stream in the plasma treatment unit.

8. A process according to claim 3, wherein the hazardous waste is solid inorganic waste and is predominantly blended with the waste stream in the plasma treatment unit.

9. A process according to claim 1, wherein the treatment of the waste stream is continuous and the introduction of hazardous waste is performed batchwise.

10. The process of claim 1 performed in an apparatus comprising the gasification unit, the plasma unit, and a conduit for establishing fluid communication between the gasification unit and the plasma treatment unit, wherein the apparatus comprises one or more air-lock means for:
(a) introducing hazardous waste into the gasification unit;
(b) introducing hazardous waste into the plasma treatment unit; and
(c) introducing hazardous waste into the conduit establishing fluid communication between the gasification unit and the plasma treatment unit.

11. The process of claim 10 wherein the gasification unit has an inlet for oxygen and optionally an inlet for steam and the plasma treatment unit has an inlet for oxygen and optionally an inlet for steam.

12. The process of claim 1 further comprising vitrifying the char material to produce a vitrified solid.

13. The process of claim 1 wherein the offgas is passed to a gas engine or gas turbine for energy production.

14. The process of claim 1 wherein the plasma treatment occurs in the presence of a plasma-stabilizing gas selected from nitrogen, argon, hydrogen and carbon monoxide.

* * * * *